United States Patent
Hoot (10) Patent No.: US 7,209,229 B2
(45) Date of Patent: Apr. 24, 2007

(54) WAVELENGTH SELECTABLE SPECTROHELIOGRAPH

(75) Inventor: John E. Hoot, San Clemente, CA (US)

(73) Assignee: Meade Instruments Corporation, Irvine, CA (US)

( * ) Notice: Subject to any disclaimer, the term of this patent is extended or adjusted under 35 U.S.C. 154(b) by 379 days.

(21) Appl. No.: 10/864,134

(22) Filed: Jun. 9, 2004

(65) Prior Publication Data

US 2005/0275838 A1 Dec. 15, 2005

(51) Int. Cl.
G01J 3/40 (2006.01)
G01J 3/18 (2006.01)

(52) U.S. Cl. ...................... 356/305; 356/328

(58) Field of Classification Search ............... 356/305, 356/326, 328, 332, 334
See application file for complete search history.

(56) References Cited

U.S. PATENT DOCUMENTS

| 3,580,679 | A | 5/1971 | Perkins | 356/76 |
| 4,705,396 | A | 11/1987 | Bergstroem | 356/332 |
| 5,717,487 | A * | 2/1998 | Davies | 356/328 |

OTHER PUBLICATIONS

Hanaoka, Multi-Wavelength, High-Speed Video Spectroheliograph, Proceedings of SPIE—Innovative Telescopes and Instrumentation for Solar Astrophysics, Feb. 2003, vol. 4853, pp. 584-592.*

Philippe Rousselle, Observing the Sun with a Spectroheliograph <http://astrosurf.com/Spectrohelio/index-qb.htm> accessed May 25, 2004, 25 pages.

Claude Plymate, "Two-Dimensional Imaging Of The Fundamental Rotation-Vibration Carbon Monoxide Lines at 4.67μm," University of Western Sydney, downloaded from the internet at www.noao.edu/noao/staff/plymate/docs/plymate_arp.pdf, on Jun. 16, 2005, 40 pages.

* cited by examiner

*Primary Examiner*—F. L. Evans
(74) *Attorney, Agent, or Firm*—Knobbe, Martens, Olson & Bear LLP (57) ABSTRACT

An apparatus, system and method are provided for composing an image at a selectable wavelength, wavelengths or bandwidth. Light passing through an entrance slit is dispersed into a spectrum and recorded. In an embodiment, spectral images corresponding to respective portions of an object are generated. Image data corresponding to a selected wavelength, wavelengths or bandwidth is extracted from the spectral images and compiled into an image of the object. In an embodiment, user optics are provided which allow a user to align the object with the entrance slit or to focus the light from the object onto the entrance slit.

16 Claims, 8 Drawing Sheets

WAVELENGTH SELECTABLE SPECTROHELIOGRAPH

BACKGROUND OF THE INVENTION

1. Field of the Invention

The present invention relates to an imaging device and method for composing an image of an object at a selectable wavelength.

2. Description of the Related Art

A spectrograph is an instrument for dispersing radiation, such as electromagnetic radiation, into a spectrum so properties of an object emitting the radiation can be observed and analyzed. To aid analysis, a spectrogram can be produced to record the spectrum. A spectrogram typically includes, for example, a photograph or diagram of the spectrum.

Figure 1:
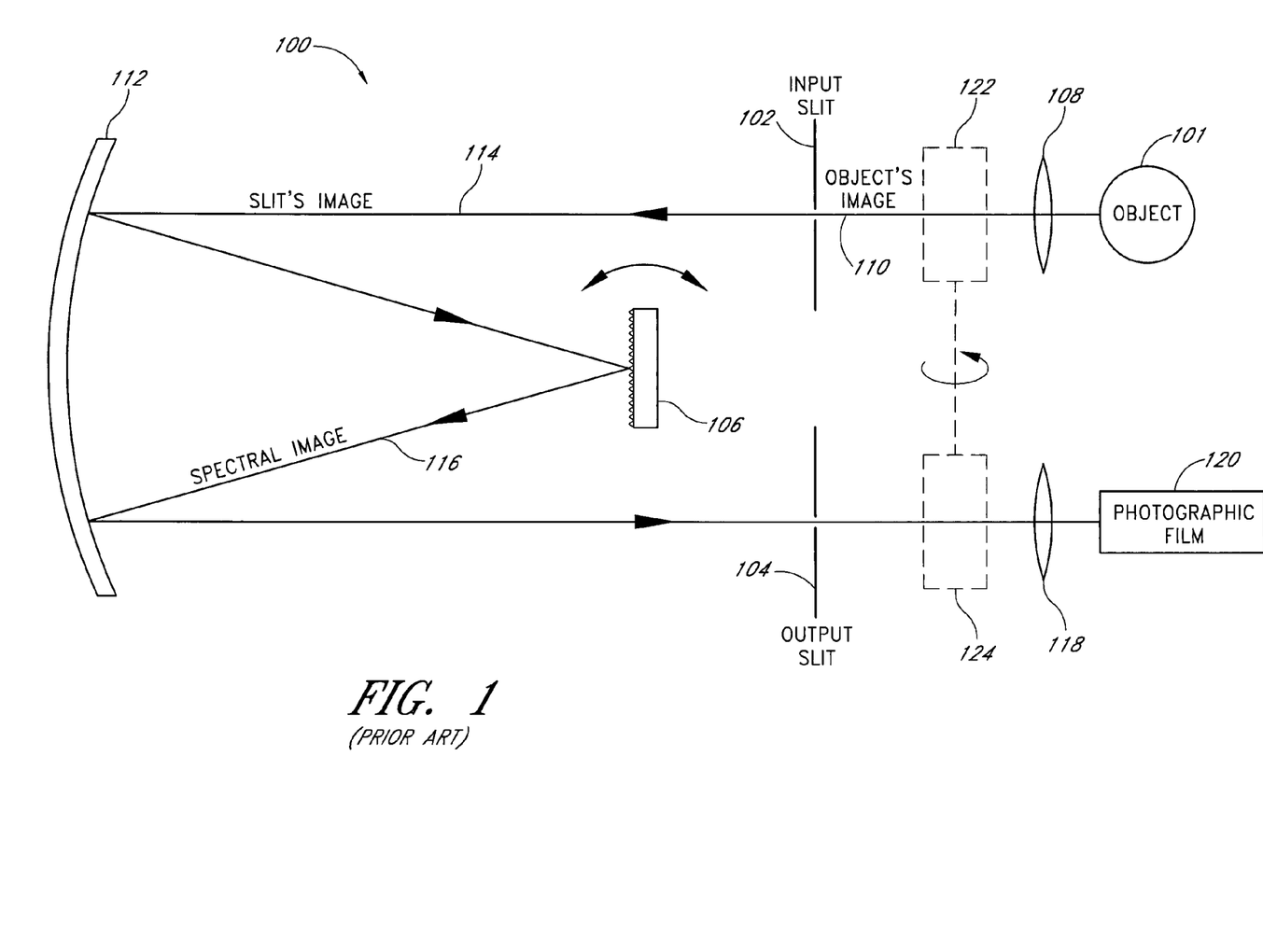
FIG. 1 is a schematic diagram of components of a conventional spectroheliograph.

It can be useful to study a single wavelength or wavelength band of a spectrum corresponding to an object. For example, spectroheliographs are used to create photographs of the sun or other celestial bodies to observe the emission or absorption of a subject element or compound. FIG. 1 illustrates various components of a conventional spectroheliograph 100 for photographing or observing an image of an object 101 at a single wavelength or band. The spectroheliograph 100 includes an input slit 102, an output slit 104, a dispersion grating 106 and an objective lens 108 for receiving light emitted or reflected from the object 101 and focusing the object's image 110 onto the input slit 102.

The input slit 102 selects a portion of the object's image 110 to pass to the grating 106 via optics 112. The portion of the object's image 110 transmitted by the input slit 102 is referred to herein as the "slit's image" 114. The optics 112 include, for example, one or more mirrors or lenses, and are configured to collimate the slit's image 114 and to focus the slit's image 114 onto the grating 106.

The grating 106 disperses the slit's image 114 to create a spectral image 116 thereof. The spectral image 116 is then directed by the optics 112 to the output slit 104 which selects a portion of the spectral image 116 to pass through an output lens 118 to photographic film 120 or to a projection screen (not shown) for direct viewing. In other words, the output slit 104 selects a wavelength or band of wavelengths from the spectral image 116 to be photographed or observed. The bandwidth photographed or observed is dependent upon variables such as the size of the output slit 104. The center wavelength photographed or observed is dependent upon factors such as the dispersion of the grating 106, the relative positions of the input slit 102, output slit 104, and grating 106, and the like.

To create a photograph of the object 101 at a selected wavelength or band, the input slit 102, the grating 106 and the output slit 104 are mechanically aligned so that the desired wavelength or band exits through the output slit 104. Then, the object's image 110 is passed by the input slit 102 while the photographic film 120 is synchronously passed by the output slit 104. Other spectroheliographs replace the output slit 104 and photographic film 120 with a linear charge coupled device (CCD) array (not shown) to create a one-dimensional photograph of the spectral image 116 at a selected wavelength. To select the desired wavelength to record, the linear CCD array in such spectroheliographs is mechanically aligned relative to the grating 106 and the input slit 102.

For direct viewing, oscillating images of the slits 102, 104 can be produced, for example, by synchronously rotating prisms 122, 124 while the object's image is passed by the input slit 102. Thus, typical spectroheliographs can be mechanically complex to operate because component positions and specifications are calculated and physically adjusted each time a user desires to observe different wavelengths or bandwidths. Further, spectroheliographs typically include motors to sweep the input slit 102 across the object's image 110 and the output slit 104 across the photographic film 120. For moving targets such as the sun, spectroheliographs also include motors to track the sun or a Coleostat to redirect the light from the moving sun into a stationary bench mounted instrument. Such motors or a Coleostat often add significant complexity and cost to conventional spectroheliograph systems.

SUMMARY OF THE INVENTION

Thus, it would be advantageous to develop a technique and system for composing an image of an object that reduces complexity and cost. It would also be advantageous to provide straightforward user selection of one or more wavelengths or bandwidths at which an image can be observed.

Accordingly, embodiments of the present invention provide an apparatus, system or method for composing an image at a selectable wavelength. In an embodiment, light passing through an entrance slit is dispersed into a spectrum. A plurality of spectral images corresponding to respective portions of an object is recorded. During, before or after recordation, data corresponding to a selected wavelength or wavelength band is extracted from the plurality of spectral images and compiled into an image of the object. Bright objects, such as the sun, can damage a user's eyes if directly viewed. Thus, in an embodiment, user optics are provided to allow the user to preview the object's image as it is presented in a safer format. The user optics allow the user to focus the object's image onto the entrance slit.

According to the foregoing, an embodiment includes a system for composing an image of an object at a selectable wavelength, wavelengths or bandwidth. The system includes an imager comprising an imaging camera and optics configured to project a plurality of spectral images onto the imaging camera. The plurality of spectral images correspond to respective portions of an object. The system may also include a processor configured to compose an image of the object at the selected wavelength, wavelengths or bandwidth by processing a plurality of wavelengths of the plurality of spectral images. The image of the object may include respective portions of the plurality of spectral images corresponding to the selected wavelength, wavelengths or bandwidth.

In an embodiment, a method is provided for composing an image of an object at a selected wavelength. The method includes generating a plurality of spectral images corresponding to respective portions of an object, storing a plurality of wavelengths of the plurality of spectral images, and extracting image data corresponding to a selected wavelength, wavelengths or bandwidth from the plurality of spectral images. The method may also include arranging the extracted image data to form an image of the object at the selected wavelength.

In an embodiment, an imaging device records a spectral image of an object. The imaging device includes a slit, a lens, dispersive optics, and an electronic imaging camera. The lens projects an image of an object onto the slit. The slit selects a portion of the image to transmit to the dispersive optics. The dispersive optics produce a spectrum of the selected portion of the image. The electronic imaging camera records the spectrum.

In an embodiment, a spectroheliograph includes means for selecting a portion of an image of an object, means for dispersing the selected portion of the image to create a spectrum thereof, means for recording some or all of the spectrum, and means for generating an electronic image of the object at a user selected wavelength.

Other features and advantages of the present invention will become apparent to those of ordinary skill in the art through consideration of the ensuing description, the accompanying drawings, and the appended claims. Neither this summary nor the following detailed description purports to define the invention. The invention is defined by the claims.

BRIEF DESCRIPTION OF THE DRAWINGS

A system and method which embodies the various features of the invention will now be described with reference to the following drawings.

DETAILED DESCRIPTION OF THE PREFERRED EMBODIMENT

The present invention involves an apparatus, system and method for composing an image of an object at a selectable wavelength, wavelengths, bandwidth, or a combination thereof. The system includes an imager configured to generate a spectral image corresponding to at least a portion of an object's image. As used herein, the term "image" includes its ordinary broad meaning, which includes the optical counterpart of an object that is produced, for example, by one or more optical or electronic devices. Thus, the term image includes a likeness of an object that can be, for example, recorded, projected onto a surface, produced on a photographic material, stored electronically as data corresponding to the image, or displayed electronically on a display screen. The term "spectral image" includes its broad ordinary meaning, which includes a spectrum of light corresponding to at least a portion of an image that is produced by a dispersive device such as a prism, grating or the like so that the light's component wavelengths are arranged in order.

In an embodiment, the spectral image is projected onto an imaging camera to be captured. The imaging camera can comprise, for example, a photographic film camera, a video camera, a motion picture system, a digital camera, a digital video camera, a matrix of photodiodes, one or more charge coupled devices (CCD), one or more complementary metal oxide silicon (CMOS) devices, combinations of the forgoing, or the like. Data corresponding to the spectral image captured by the imaging camera is stored in a memory device and can be transmitted to a processor configured to compose an image of the object at a selected wavelength, wavelengths or bandwidth.

According to an embodiment of the invention, the system composes an image of an object at a selected wavelength, wavelengths or bandwidth by recording a plurality of spectral images of an object as the object is scanned. The system extracts data corresponding to the selected wavelength, wavelengths or bandwidth from the plurality of spectral images. The data is selected based at least in part on the angular dispersion of the selected wavelength, wavelengths or bandwidth relative to the imaging camera. Thus, from a single scan, it is possible to create many images of the object at respective wavelengths or bandwidths. The object can be scanned, for example, by sweeping the system across the object's image. In an exemplary embodiment, the system scans the object by keeping the system in a static position and allowing the image of the object to move across the system.

An apparatus for recording spectral images of an object includes an entrance slit and dispersive optics, such as a grating, configured to project a spectral image of the entrance slit onto an imaging camera. The apparatus further includes a memory device configured to store data corresponding to the spectral image. In an embodiment, the apparatus includes user optics and a projection screen configured to allow a user to preview an image of the object. Thus, the user can align the apparatus with the object and focus the image of the object onto the slit. In an embodiment, the apparatus further includes a shadow wire and a shadow target configured to allow a user to align the apparatus with the object. In an embodiment, the apparatus also includes a filter configured to attenuate the light received from the object.

In the following description, reference is made to the accompanying drawings, which form a part hereof and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or advantages or with certain alternative equivalent components and methods to those described herein. In other instances, well-known components and methods have not been described in detail so as not to unnecessarily obscure aspects of the present invention.

Figure 2:
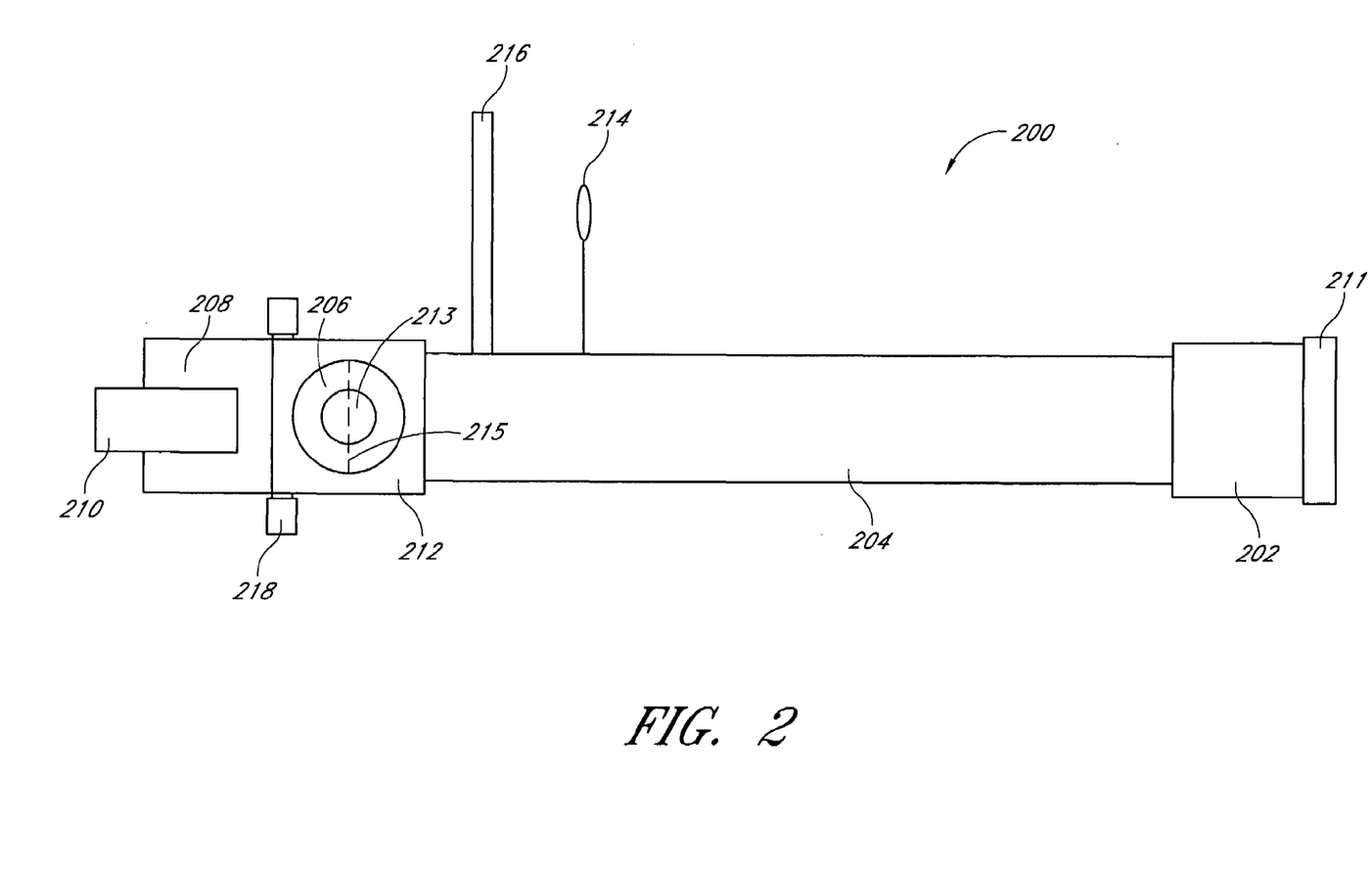
FIG. 2 is a simplified side view of an exemplary spectroheliograph according to an embodiment of the invention.

FIG. 2 is a simplified side view of an exemplary spectroheliograph 200 according to an embodiment of the invention. The spectroheliograph 200 comprises objective optics 202, an optical path 204, user optics 206, imaging optics 208 and an image recording device 210. The spectroheliograph 200 is configured to generate images of objects at selected wavelengths or wavelength bands. For example, the spectroheliograph 200 may be used to compose images of the sun at wavelengths corresponding to energy emitted or absorbed by gases in the sun's atmosphere. Thus, the spectroheliograph 200 safely produces images of the sun that can be used in astronomy, helioseismology, amateur astronomy, classroom settings, and the like. The spectroheliograph 200 can also be used, for example, to observe the moon for mineralogy, to image spectrographs of chemicals in laboratories or in the environment, or the like. For example, the spectroheliograph 200 can be used to analyze the elements of a chemical fire.

The objective optics 202 include an adjustable lens (not shown) such as a helical focus lens or the like for focussing an image of an object onto the user optics 206 and the imaging optics 208 through the optical path 204. The objective optics 202 can also include, for example, a filter 211 configured to attenuate the energy of the light received into the optical path 204. In an embodiment, a telescope that includes the objective optics 202 and optical path 204 is fitted with the user optics 206, dispersive optics 208 and image recording device 210 to form the spectroheliograph 200.

The user optics 206 are housed in a preview or focus box 212 and are configured to allow a user to align and focus the spectroheliograph 200. For example, FIG. 2 shows the sun's image 213 displayed through the user optics 206 in the preview box 212. The user optics 206 are configured such that the sun's image 213 in the focus box 212 is safer to look at than looking directly at the sun. Therefore, a user can align the spectroheliograph 200 by positioning the sun's image 213 relative to alignment indicia 215 disposed on the user optics 206 or within the focus box 212. The alignment indicia 215 may be positioned to align the sun's image 213 relative to, for example, an entrance slit (not shown) that is part of the imaging optics 208. The user can also focus the sun's image 213 onto the imaging optics 208 by focusing the sun's image 213 within the focus box.

The spectroheliograph 200 also includes a shadow wire 214 and a shadow target 216 to align the spectroheliograph 200 with bright objects such as the sun. Without looking directly at the bright object, a user can illuminate the shadow wire 214 and shadow target 216 with light from the object such that a shadow of the shadow wire 214 is formed on the shadow target 216. The user aligns the spectroheliograph 200 with the object by, for example, aligning the shadow of a loop or other portion of the shadow wire 214 with a predetermined or marked portion (not shown) of the shadow target 216.

In an embodiment, the image of the object is directed from the optical path 204 to both the user optics 206 and the imaging optics 208 using, for example, a beam splitter (not shown). Alternatively, the focus box 212 includes a mirror (not shown) configured to be "flipped" or moved into position using, for example, a controller 218 to selectively direct the image of the object to either the user optics 206 or the imaging optics 208. The imaging optics 208 are configured to generate a spectrum of a portion of the object's image and to project the spectrum onto the image recording device 210. The image recording device 210 is configured to record the spectrum corresponding to the portion of the image. In an embodiment, the spectroheliograph 200 is further configured to compose an image of the object at a selected wavelength, wavelengths or bandwidth.

Figure 3:
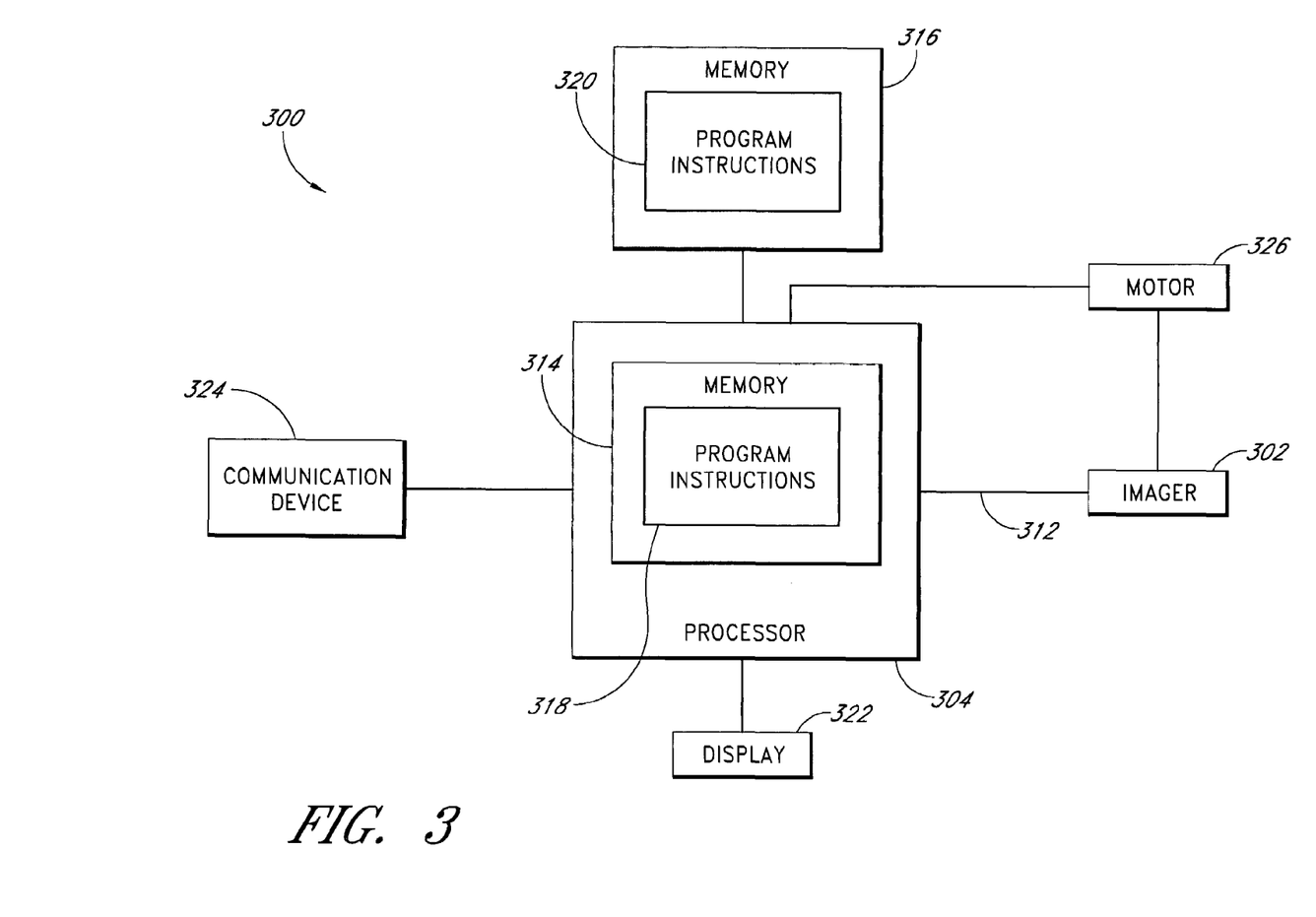
FIG. 3 is a block diagram illustrating a spectroheliograph system according to an embodiment of the invention.

FIG. 3 is a block diagram illustrating a spectroheliograph system 300 according to an embodiment of the invention. The spectroheliograph system 300 comprises an imager 302 coupled to a processor 304. The imager 302 is configured to receive light from an object (not shown) and to generate one or more spectral images corresponding to one or more respective portions of the object. The imager 302 can record the one or more spectral images using, for example, photographic film, magnetic storage media, optical storage media, solid-state storage media, or the like.

The imager 302 is configured to generate a data signal 312 corresponding to the one or more spectral images. In some embodiments, the imager 302 generates the data signal 312 when detecting the one or more spectral images. For example, the imager may detect the one or more spectral images using CCD, CMOS or other forms of digital imaging that can directly produce the electronic data signal 312. In certain embodiments, the imager 302 generates the data signal 312 by converting the one or more spectral images recorded in a first format into a second format. For example, the imager 302 may record the one or more spectral images using photographic film, magnetic videotape or other analog media. The spectral images can then be "digitized" or converted to a data format that can be manipulated using, for example, a digital signal processor or other computing device.

The processor 304 is configured to receive the data signal 312 from the imager 302 and to compose an image of the object at a selected wavelength or wavelength band. The processor 304 comprises, by way of example, one or more controllers, program logic, hardware, software, or other substrate configurations capable of representing data and instructions which operate as described herein or similar thereto. The processor 304 may also comprise controller circuitry, processor circuitry, digital signal processors, general purpose single-chip or multi-chip microprocessors, combinations of the foregoing, or the like.

In an embodiment, the processor 304 includes an internal memory device 314 comprising, for example, random access memory (RAM). The processor 314 can also be coupled to an external memory device 316 comprising, for example, drives that accept hard and floppy disks, tape cassettes, CD-ROM or DVD-ROM. The internal memory device 314 or the external memory device 316, or both, can comprise program instructions 318, 320 for processing the signal 312 received from the imager 302, composing a digital image of the object at a selected frequency, storing data including digital image data, displaying data including digital image data and other functions as described herein.

The processor 304 is coupled to a display 322 and a communication device 324. The display 322 is configured to display, for example, the spectral image, the image of the object, a composed electronic image of the object at a selected wavelength, wavelengths or bandwidth, or the like. The display 322 comprises a video monitor such as a cathode ray tube (CRT), a plasma display, a liquid crystal display (LCD) device, or the like. The communication device 324 is configured to provide communication with external systems and devices and can comprise, for example, a serial port, a parallel port, a universal serial bus (USB) controller, or an Internet or other network adapter. The communication device 324 can also include user input devices such as a keypad, a mouse, user buttons, or any device that allows a user to enter data into the processor 304.

In an exemplary embodiment, the imager 302 remains stationary and records spectral images corresponding to respective portions of the object as the object's image passes by the imager 302. For example, the imager 302 can be positioned such that the rotation of the earth relative to the sun causes an image of the sun to pass over the imager 302. The processor 304 is configured to control the frequency at which the imager 302 records the spectral images. According to an embodiment, the processor 304 periodically records the spectral images.

In some embodiments, the spectroheliograph system 300 also includes a motor 326 coupled to the imager 302. The motor 326 is controlled by the processor 304 and is configured to sweep the imager 302 across the object's image while the imager 302 records spectral images corresponding to respective portions of the object. By adjusting the rate at which the imager 302 scans the object's image using the motor 326, a user can record features or events that might otherwise be missed. For example, a solar disk size of approximately 30 arcminutes would take approximately two minutes to drift across a point on the imager 302. Some of the sun's faculae, prominences or other features such as solar flares may occur at a rate that is less than this two minute drift rate and can, therefore, be recorded by scanning the sun's image at a faster rate. The processor 304 is configured to control the rate at which the motor 326 sweeps the imager 302 across the object's image.

Figure 4:
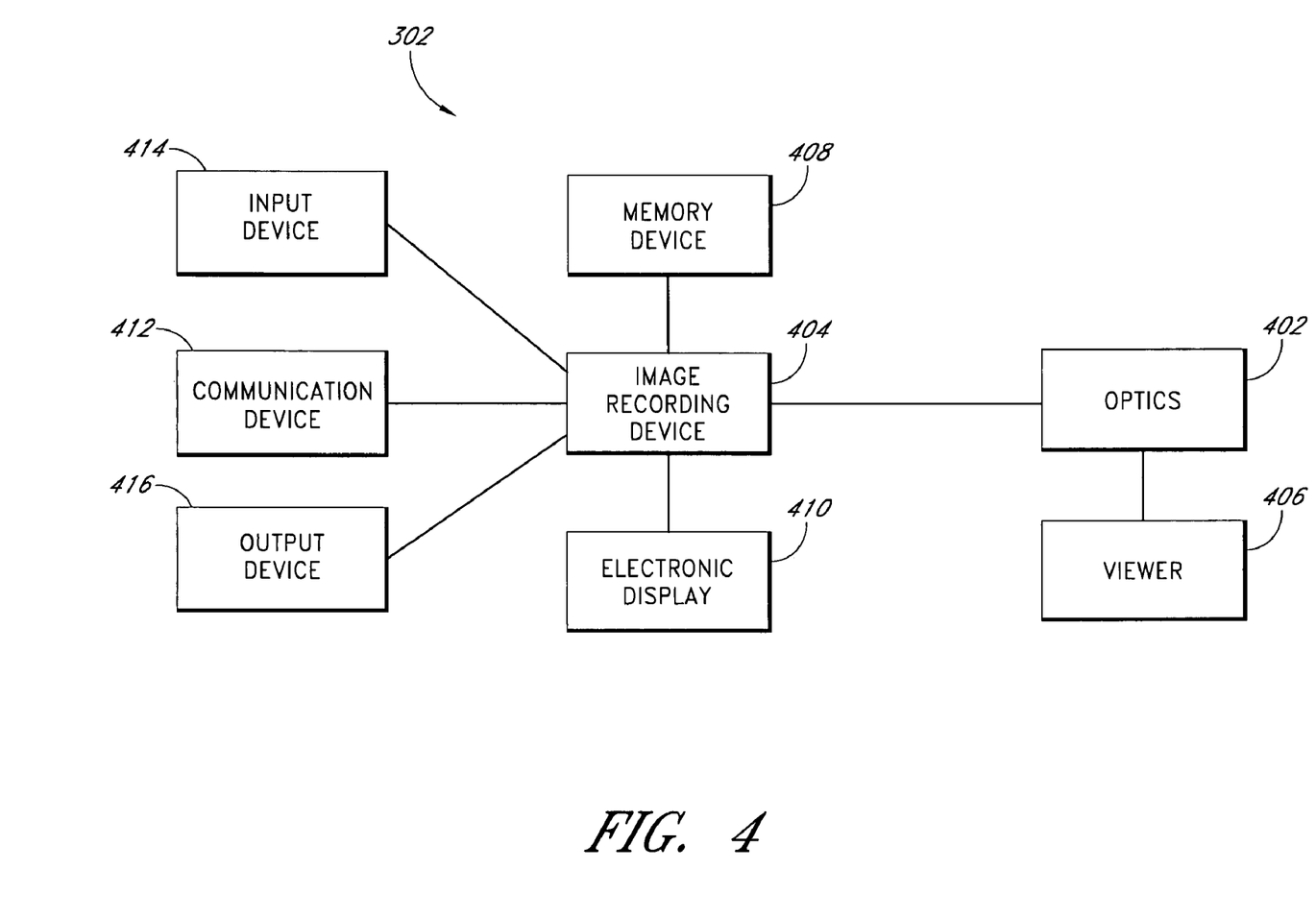
FIG. 4 is a block diagram of an exemplary imager usable by the spectroheliograph system of FIG. 3.

FIG. 4 is a block diagram of an exemplary imager 302 usable by the spectroheliograph system of FIG. 3. The imager 302 includes optics 402 coupled to an image recording device 404. The optics 402 are configured to receive an image of an object (not shown), select a portion of the object's image, disperse the selected portion to generate a spectral image thereof, and project the spectral image onto the image recording device 404. In an embodiment, the optics 402 are also coupled to a viewer 406. The viewer 406 is configured to allow a user to view the image of the object. The viewer 406 can include, for example, a projection screen or the like.

The image recording device 404 is configured to record the spectral image. The image recording device 404 can include, for example, a photographic film camera, a video camera, a motion picture system, a digital camera, a digital video camera, one or more of photodiodes, one or more charge coupled devices (CCD), one or more complementary metal oxide silicon (CMOS) devices, combinations of the forgoing, or the like. In an exemplary embodiment, the image recording device 404 is a digital camera configured to generate a two-dimensional electronic image data of the spectral image.

The imager 302 further includes a memory device 408, a electronic display 410, a communication device 412, an input device 414 and an output device 416. The memory device 408 is configured to store image data corresponding to one or more spectral images recorded by the image recording device 404. The memory device may comprise, for example, flash memory, random access memory (RAM) or drives that accept hard or floppy disks, tape cassettes, CD-ROM or DVD-ROM. The electronic display 410 is configured to display the images generated by the image recording device 404. In an embodiment, the electronic display 410 comprises a liquid crystal display (LCD) or similar device, such as those associated with, for example, digital cameras, camcorders, laptops, cell phones, personal digital assistants (PDAs), other computing devices, or the like.

The communication device 412 is configured to transmit image data corresponding to one or more spectral images recorded by the image recording device 404 to an external device (not shown) such as a personal computer, computer system, network, display, memory, or the like. In an exemplary embodiment, the communication device 412 is a USB controller. The input device 414 may include, for example, an Internet or other network connection, a mouse, a keypad or any device that allows an operator to enter data into the image recording device 404. The output device 416 may include, for example, a printer or other device or system for generating hard or soft copies of images.

Figure 5:
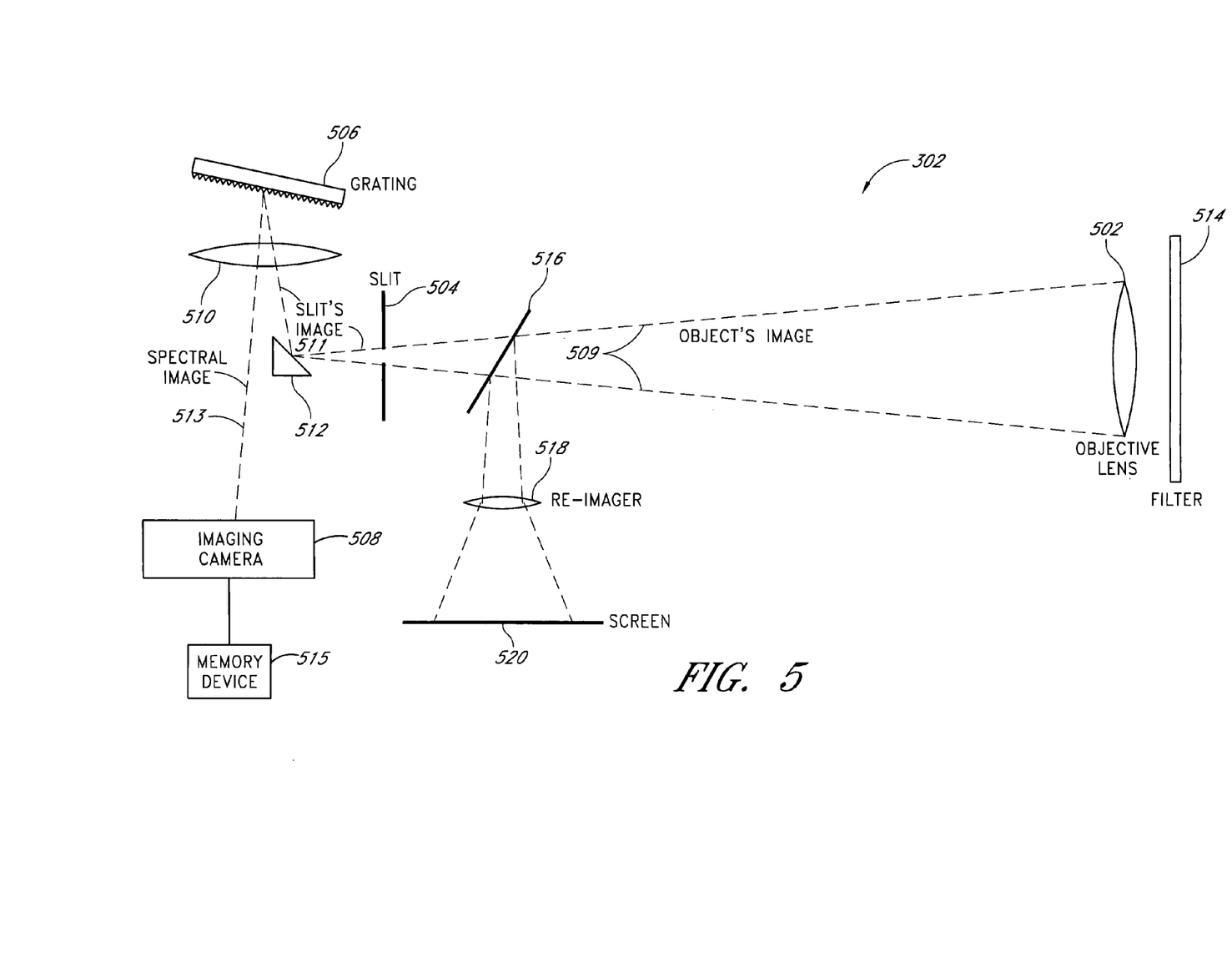
FIG. 5 is a schematic diagram of components of an exemplary imager according to an embodiment of the invention.

FIG. 5 is a schematic diagram of components of an exemplary imager 302 usable by the spectroheliograph system of FIG. 3. The imager 302 includes an objective lens 502, a slit 504, a grating 506 and an imaging camera 508. The objective lens 502 is configured to project an image 509 of an object (not shown) onto the slit 504. The size of the object's image 509, or "image size," at the slit 504 is a function of the "solar size," or angle of the incident beam to the optical axis, and the focal length from the objective lens 502 to the slit 504. Thus, for a desired image size, the focal length can be determined by:

Focal Length=2*(Image Size)/[tan(Solar Size)/2]    (1).

The slit 504 is configured to select a narrow portion of the object's image 509 to be transmitted to the grating 506. The size of the opening of the slit 504, or "slit size," is directly related to the image size and the desired spatial resolution. In an embodiment, the slit size is given by:

Slit Size=Image Size(Resolution/Solar Size)    (2).

In an exemplary embodiment, the resolution is 4 arcseconds, the image size is 6 millimeters, and the solar size is 30 arcminutes. Using equation (1), the focal length is approximately 275 centimeters. Using equation (2), the slit size is approximately 0.013 millimeters. An artisan will recognize from the disclosure herein many possible combinations of solar size, focal length and slit size to create a desired resolution.

Since the slit size is directly proportional to the image size, which in turn is directly proportional to the focal length, resolution can be maintained for smaller focal lengths by creating narrower and more accurate slits as compared to slits used with longer focal lengths. In an embodiment, the slit 504 is created by epitax coating a transparent surface (not shown) with an opacifier such as titanium oxide, tin oxide, zirconium oxide, combinations of the foregoing, or the like. In an embodiment, the transparent surface can also be coated with a low reflection material, such as argon or the like, to reduce reflections. A narrow slit is formed on the transparent surface by removing a portion of the coatings using, for example, a laser. In an exemplary embodiment, a laser is used to burn a slit size of approximately 10 microns through the opaque coating.

The light passing through the slit 504 (i.e., the slit's image 511) is directed by optics 512 to the grating through a lens 510. The optics 512 can include, for example, one or more mirrors, a coherent fiber optic bundle, a combination of the foregoing, or the like. The grating 506 and lens 510 are in a Littrow configuration wherein the bi-convex lens 512 collimates the slit's image 511 and focuses it onto the grating 506. Dispersed light from the grating 506 (i.e. a spectral image 513) passes back through the bi-convex lens 510 and illuminates the imaging camera 508. An artisan will recognize that other dispersion configurations are possible including, without limitation, Hale, Ebert and Arcetri configurations. An artisan will also recognize that the grating 506 can be replaced with a prism or other optical device for dispersing light. In an exemplary embodiment, the grating 506 is a first-order, hydrogen diffraction grating.

The imaging camera 508 is configured to record the spectral image 513. The imaging camera 508 may comprise, for example, a photographic film camera, a video camera, a motion picture system, a digital camera, a digital video camera, a matrix of photodiodes, one or more charge coupled devices (CCD), one or more complementary metal oxide silicon (CMOS) devices, combinations of the forgoing, or the like. The imager 302 further includes a memory device 515 configured to store image data proportional to the spectral image 513 captured by the imaging camera 508. In an exemplary embodiment, the imaging camera 508 comprises a two-dimensional CCD array configured to generate an electrical signal comprising the image data. In certain embodiments, the imager 302 generates the image data by digitizing one or more spectral image 513 captured by the imaging camera 508. For example, the imaging camera may comprise a motion picture system that captures one or more spectral images 513 on celluloid film. The one or more spectral images 513 stored on the celluloid film can then be converted to electronic image data and stored in the memory device 515.

In an embodiment, a selected wavelength, wavelengths or bandwidth can be extracted from the image data for analysis or to be combined with data of the same wavelength, wavelengths or bandwidth corresponding to other portions of the object. Thus, an image of the object at the selected wavelength, wavelengths or bandwidth can be generated. The width of the selected wavelength bandwidth depends on such factors as the resolution of the imaging camera 508 and the dispersion of the grating 506.

The angular dispersion θ of the grating 506 is a function of the wavelength λ, the order n of the grating 506 and the grating space. The angular dispersion θ is given by:

$$\theta = a\ \sin(n\lambda/\text{Grating Space}) \quad (3).$$

Given the position of the imaging camera 508 relative to the grating 506, equation (3) can be used to select data corresponding to a wavelength, wavelengths or bandwidth from the image data produced by or derived from the imaging camera 508. For example, equation (3) provides that a first-order grating 506 having a grating space of approximately one line per millimeter will have an angular dispersion θ of approximately 41.018 degrees for a wavelength λ of 6563 Angstroms. Thus, the position on the imaging camera 508 of illumination due to a wavelength λ of approximately 6563 Angstroms can be determined and correlated to the image data. Here, 6563 Angstroms approximately represents the wavelength of hydrogen alpha, which is the first line of the Balmer series for hydrogen and is provided for exemplary reasons only and is not intended to limit or construe the disclosure or claims. In fact, an artisan will recognize from the disclosure herein many possible wavelengths that can be used.

In an embodiment, the imager 302 also includes a filter 514 configured to attenuate the energy of the light collected by the objective lens 502. In an embodiment, the imager 302 further includes directive optics 516, a re-imager 518 and a screen 520 configured to display the object's image 509. The directive optics 516 can include, for example, a mirror or a beam splitter. In an embodiment, the directive optics are placed at approximately equal distances from the slit 504 and the re-imager 518 such that the objective lens 502 can focus the object's image 509 on both the slit 504 and the re-imager 518. Thus, by viewing the object's image 509 on the screen 520, a user can align the objective lens 502 with the object and focus the object's image 509 onto the slit 504.

Figure 6:
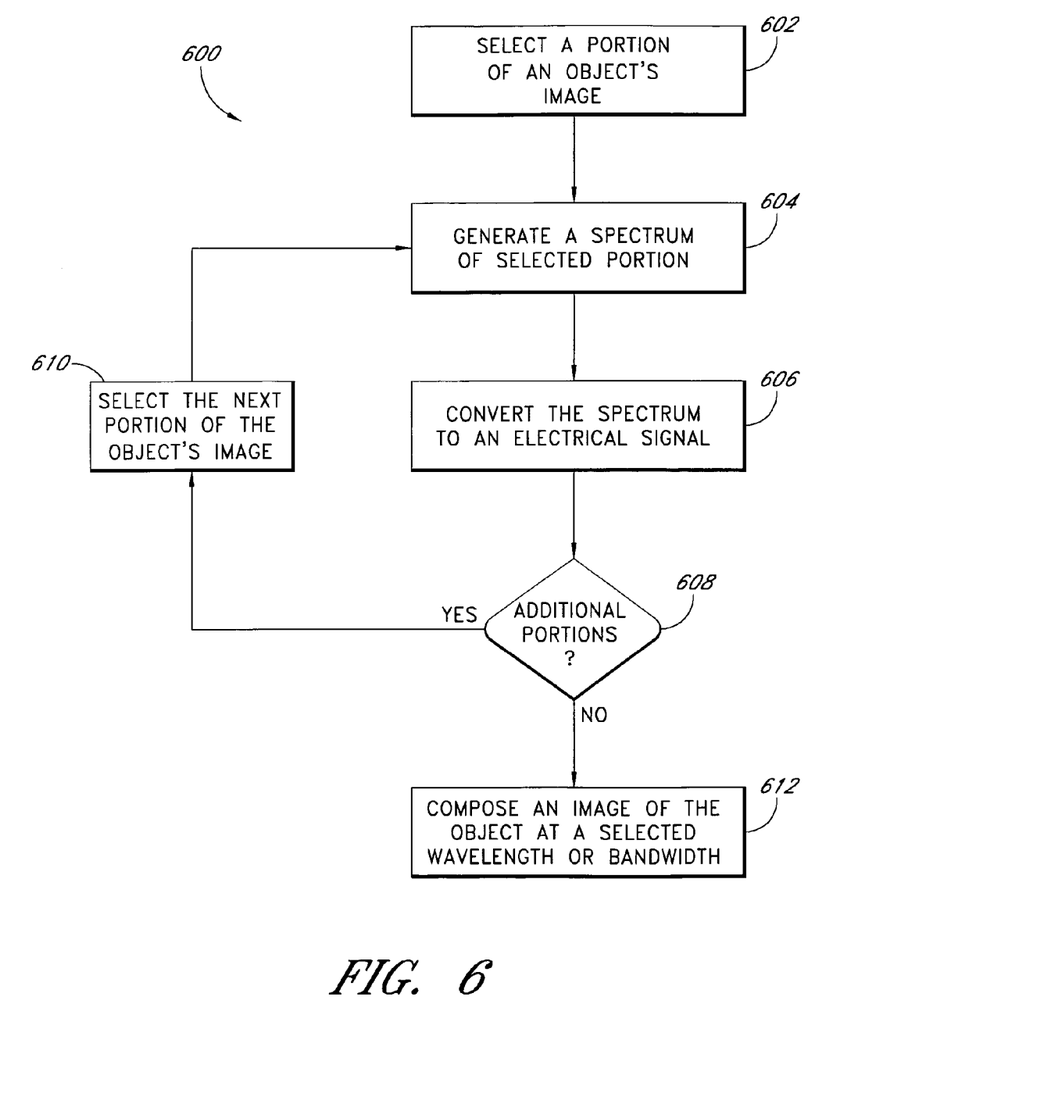
FIG. 6 is a flow chart of an exemplary imaging process usable by a spectroheliograph, such as the spectroheliograph system of FIG. 3.

FIG. 6 is a flow chart of an exemplary imaging process 600 usable by a spectroheliograph, such as the spectroheliograph system 300 of FIG. 3. The imaging process 600 comprises, in short, selecting a portion of an object's image, generating a spectrum of the selected portion, converting the spectrum to an electrical signal, repeating the above steps for additional portions of the object's image, and composing an image of the object at a selected wavelength, wavelengths or bandwidth.

At block 602, the process 600 includes selecting a portion of an object's image. The portion can be selected, for example, by positioning an opening relative to the object's image and allowing a portion of the image to pass through the opening. In an embodiment, the spatial resolution of an image of the object is a function at least in part of the size of the selected portion.

At block 604, the process 600 includes generating a spectrum of the selected portion of the object's image. The spectrum may be generated, for example, by passing the selected portion through a dispersive medium such as a prism, grating, or the like. In an embodiment, the spectral resolution of an image of the object is a function of the angular dispersion of the spectrum. At block 606, the process 600 includes converting the spectrum to an electrical signal. In an embodiment, the electrical signal comprises imaging data. The electrical signal can be stored or transmitted to processing circuitry.

At block 608, the process 600 includes querying whether there are additional portions of the object's image to be processed. If yes, the process 600 at blocks 604 and 606 are repeated for the additional portions of the object's image. At block 610, the process 600 includes selecting the next portion of the object's image to be processed. In an embodiment, the next portion is selected by repositioning an opening relative to the object's image and allowing a portion of the image to pass through the opening. In an embodiment, the opening is physically repositioned using, for example, a motor.

In an exemplary embodiment, the opening is initially positioned to allow the object's image to pass by the opening while portions of the object's image are successively processed. For example, in an embodiment, an opening is aligned with a celestial body, such as the sun. As the earth moves relative to the sun, an image of the sun moves across the opening. Portions of the sun's image are selected based on the rate at which the sun's image naturally moves across the opening. In an embodiment, the sampling rate is determined by the aspect ratio of the opening size and the size of the sun's image at the opening. Since the sun's image can sweep across the opening without moving the opening relative to its position on the earth, the complexity and cost of scanning the sun's surface is reduced.

Figure 7A:
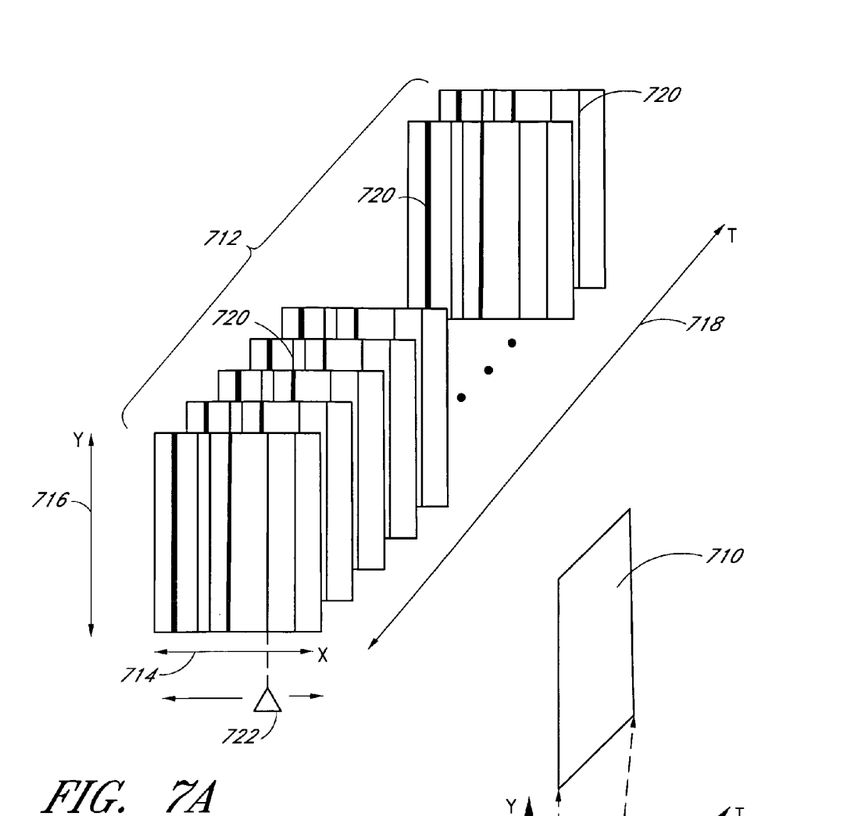
FIGS. 7A and 7B are exemplary graphical representations of an image composed at a selected wavelength, wavelengths or bandwidth from data taken from a plurality of spectral images.
Figure 7B:
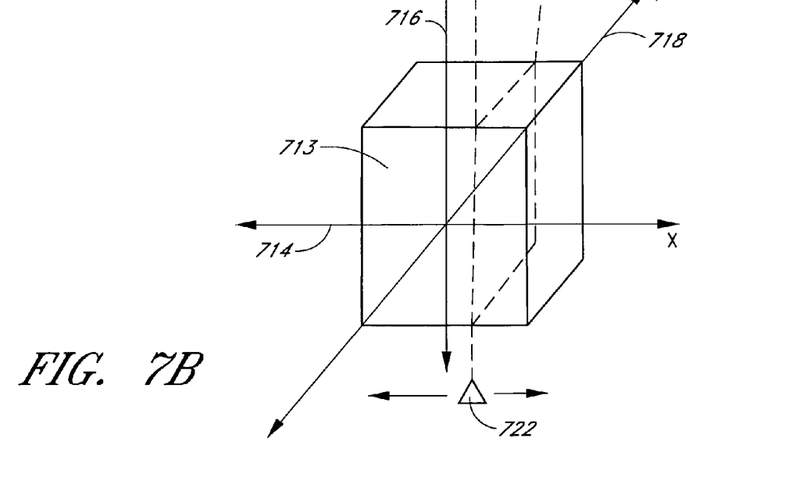

At block 612, the process 600 includes composing an image of the object at a selected wavelength, wavelengths or bandwidth. In an embodiment, the composed image comprises a compilation of spectral images at the selected wavelength, wavelengths or bandwidth. The spectral images correspond to respective portions of the object's image. For example, FIGS. 7A and 7B are exemplary graphical representations of an image 710 at a selected wavelength, wavelengths or bandwidth composed from data taken from a plurality of spectral images 712 (seven shown). As shown in FIG. 7B, the plurality of spectral images 712 can be combined into a data set referred to herein as an "image cube" 713.

For illustrative purposes, the plurality of spectral images 712 and image cube 713 are shown with respect to a three-dimensional coordinate system comprising an X-axis 714, a Y-axis 716 and a T-axis 718. The X-axis 714 corresponds to the ordered wavelengths comprising the respective spectrum of the plurality of spectral images 712 or image cube 713. As shown in FIG. 7A, the respective spectrum are illustrated as spectral lines 720 such as those produced when elements or compounds emit or absorb radiation. The spectral lines 720 run substantially in the Y-axis 716 direction, which corresponds to a first spatial direction of an object (not shown) being viewed.

The T-axis 718 corresponds to an elapsed time and qualitatively illustrates the time differences between the plurality of spectral images 712. Each of the plurality of spectral images 712 corresponds to a respective portion of the object in a second spatial direction. In an embodiment, the plurality of spectral images 712 are successively generated while the object is scanned in the second spatial direction. Alternatively, or in addition, two or more of the plurality of spectral images 712 can be generated at substantially the same time using, for example, more than one imaging device.

The image 710 is composed at the selected wavelength, wavelengths or bandwidth by extracting data corresponding to a location along the X-axis 714 from the plurality of spectral images 712. For illustrative purposes, FIGS. 7A and 7B represent the selected location along the X-axis 714 with a graphical "slider" 722. The location of the slider 722 defines the portion of the data to be extracted and compiled into the image 710 of the object. The slider 722 is selectively positioned along the X-axis 714 at a position that corresponds to the selected wavelength. In an exemplary embodiment, the slider 722 comprises software configured to determine the data to be extracted from the plurality of spectral images 712 or the image cube 713 based on the selected wavelength, wavelengths or bandwidth. The slider 722 may use a look-up table, for example, to coordinate wavelengths with corresponding data along the X-axis 714.

In an embodiment, the data is extracted as each successive spectral image 712 is generated. The data can then be juxtaposed to create the image 710 of the object while additional spectral images 712 are generated. Thus, for example, a user can pre-select a wavelength, wavelengths or bandwidth before or during a scanning process that generates the plurality of spectral images 712. The user may also view the image 710 of the object while the scanning process is taking place using, for example, a video display screen (not shown). Additionally, or in other embodiments, the spectral images 712 are combined into the image cube 713 as a set of data that can be stored or processed. Thus, for example, a user can scan an object to generate the image cube 713 without selecting beforehand which wavelength, wavelengths or bandwidth to include in the composed image 710 of the object. Furthermore, the user can generate more than one image 710 at various wavelengths or bandwidths from a single scan.

Figure 8:
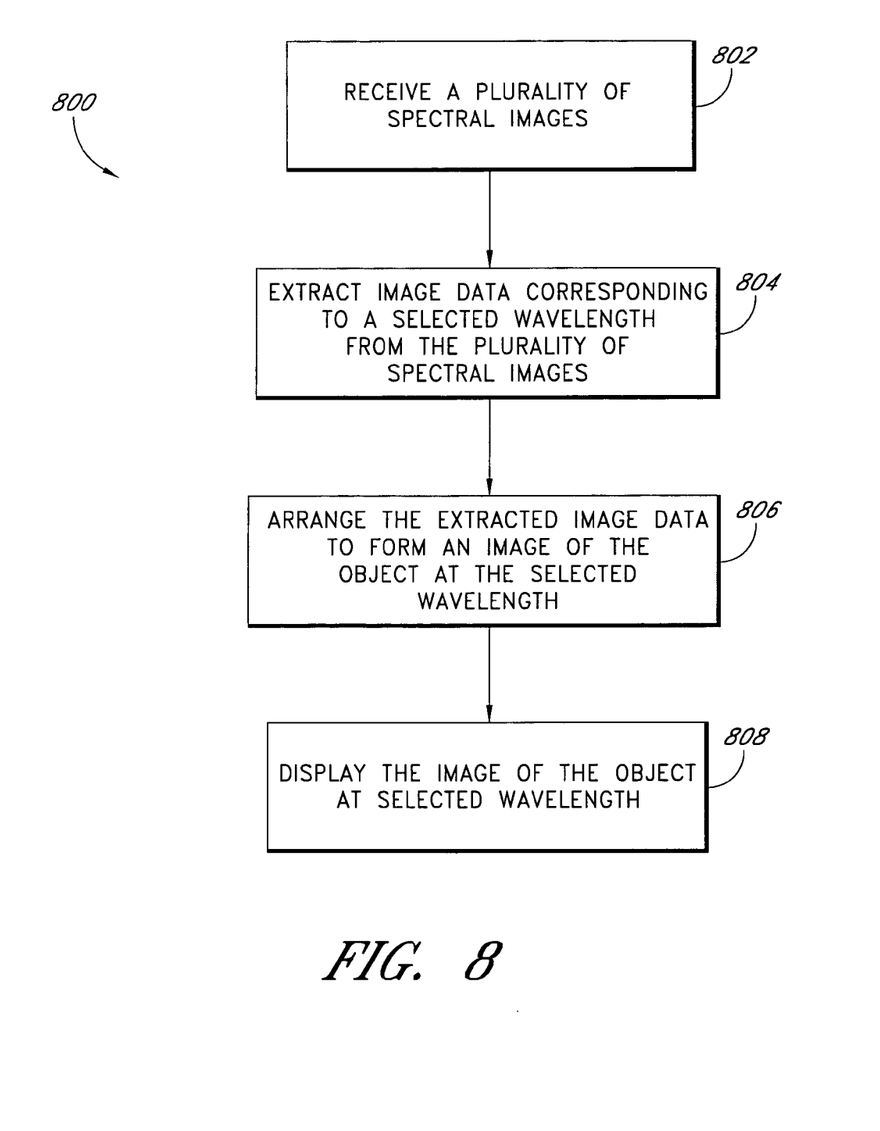
FIG. 8 is a flow chart of an exemplary image composition process usable by a spectroheliograph, such as the spectroheliograph system of FIG. 3.

FIG. 8 is a flow chart of an exemplary image composition process 800 usable by a spectroheliograph, such as the spectroheliograph system 300 of FIG. 3. At block 802, the process 800 includes receiving a plurality of spectral images. In an embodiment, the plurality of spectral images corresponding to respective portions of an object. At block 804, the process 800 includes extracting image data corresponding to a selected wavelength from the plurality of spectral images. In an embodiment, the image data is extracted using digital signal processing based at least in part on the angular dispersion of the selected wavelength relative to the position of an imaging camera.

At block 806, the process 800 includes arranging the extracted image data to form an image of the object at the selected wavelength. In an embodiment, the extracted image data is arranged sequentially according to corresponding respective portions of the object. Thus, for example, a substantially complete image of the object can be composed at the selected wavelength. At block 808, the process 800 includes displaying the image of the object at the selected wavelength. An artisan will recognize from the disclosure herein that the selected wavelength can include one or more wavelengths comprising a specified bandwidth. The composed image can be displayed, for example, as a hard copy, as an image on a video or projection screen, combinations of the foregoing, or the like.

Although the present invention has been described with reference to specific embodiments, other embodiments will occur to those skilled in the art. It is to be understood that the embodiments described above have been presented by way of example, and not limitation, and that the invention is defined by the appended claims.

What is claimed is:

1. A system for composing an image of an object at a selectable wavelength, the system comprising:
    an imager comprising:
        an imaging camera; and
        optics configured to project a plurality of spectral images onto the imaging camera, the plurality of spectral images corresponding to respective portions of an object; and
    a processor configured to compose an image of the object at a selected wavelength by processing a plurality of wavelengths of the plurality of spectral images, the image of the object comprising respective portions of the plurality of spectral images corresponding to the selected wavelength.

2. The system of claim 1, wherein the object is the sun, and wherein the imager is configured remain in a substantially fixed position with respect to a location on the earth while storing the plurality of spectral images, as the sun moves across the optics.

3. The system of claim 1, further comprising a motor coupled to the imager, the motor configured to sweep the optics past the object at a predetermined rate.

4. The system of claim 1, wherein the imaging camera is selected from the group comprising a photographic film camera, a video camera, a motion picture system, a digital camera, a digital video camera, one or more photodiodes, one or more charge coupled devices (CCD), or one or more complementary metal oxide silicon (CMOS) devices.

5. The system of claim 1, further comprising a memory device configured to store image data corresponding to the plurality of spectral images.

6. The system of claim 1, wherein the optics comprise a slit configured to select the respective portions of the object and a grating configured to disperse an image of the slit.

7. The system of claim 6, further comprising user optics that allow a user to focus light from the object onto the slit without directly viewing the light.

8. The system of claim 6, further comprising user optics that allow a user to align an image of the object with the slit.

9. The system of claim 1, further comprising a display device configured to display the image of the object at the selected wavelength.

10. An imaging device for recording a spectral image of an object, the imaging device comprising:
    a slit;
    a lens configured to project an image of an object onto the slit, wherein the slit is configured to select a portion of the image;
    dispersive optics configured to produce a spectrum of the selected portion of the image;
    an electronic imaging camera configured to record a plurality of wavelengths of the spectrum; and
    a processor configured to compose an electronic image of the object at a user selected wavelength chosen from the plurality of wavelengths.

11. An imaging device for recording a spectral image of an object, the imaging device comprising:
   a slit;
   a lens configured to project an image of an object onto the slit, wherein the slit is configured to select a portion of the image;
   dispersive optics configured to produce a spectrum of the selected portion of the image;
   an electronic imaging camera configured to record a plurality of wavelengths of the spectrum; and
   a projection screen configured to display the image of the object.

12. The imaging device of claim 11, further comprising a mirror configured to selectively direct the image of the object between the slit and the projection screen.

13. The imaging device of claim 11, further comprising a beam splitter configured to direct the image of the object to the slit and the projection screen.

14. A spectroheliograph comprising:
   means for selecting a portion of an image of an object;
   means for dispersing the selected portion of the image to create a spectrum thereof;
   means for recording a plurality of wavelengths of the spectrum; and
   means for generating an electronic image of the object at a user selected wavelength chosen from the recorded plurality of wavelengths.

15. The spectroheliograph of claim 14, further comprising means for aligning the spectroheliograph with a shadow of the object.

16. The spectroheliograph of claim 14, further comprising means for previewing the image of the object.

* * * * *

UNITED STATES PATENT AND TRADEMARK OFFICE
CERTIFICATE OF CORRECTION

PATENT NO. : 7,209,229 B2  Page 1 of 1
APPLICATION NO. : 10/864134
DATED : April 24, 2007
INVENTOR(S) : John E. Hoot It is certified that error appears in the above-identified patent and that said Letters Patent is hereby corrected as shown below:

Title Page, column 1 (U.S. Patent Documents), line 2 please delete "Bergstroem" and insert -- Bergstrom --, therefor.

At column 7, line 38, after "408," please delete "a" and insert -- an --, therefor.

Signed and Sealed this

Twenty-fourth Day of June, 2008

JON W. DUDAS
*Director of the United States Patent and Trademark Office*